United States Patent [19]

En

[11] 4,158,748
[45] Jun. 19, 1979

[54] APPARATUS FOR DIGITAL DATA SYNCHRONIZATION

[75] Inventor: John En, Palatine, Ill.

[73] Assignee: Motorola, Inc., Schaumburg, Ill.

[21] Appl. No.: 810,249

[22] Filed: Jun. 27, 1977

[51] Int. Cl.² .............................................. H04L 7/00
[52] U.S. Cl. ................................... 178/69.1; 178/68; 340/146.1 D
[58] Field of Search .............. 340/146.1 D; 325/38 R, 325/58; 179/15.55 T; 178/68, 69.1

[56] References Cited

U.S. PATENT DOCUMENTS 3,466,601  9/1969  Tong ............................ 340/146.1 D Primary Examiner—Robert L. Griffin
Assistant Examiner—Marc E. Bookbinder
Attorney, Agent, or Firm—Victor Myer; James W. Gillman

[57] ABSTRACT

A system, including an encoder and decoder, for the transmission of digital information over a transmission medium. The encoder processes a data stream of length M and generates a transmission bit stream. The processing includes combination of the M data bits with N predetermined sync bits, via a modulo-2 adder. The resulting transmission stream has a total length less than M+N, thereby substantially minimizing the number of bits otherwise required.

The decoder regenerates the data bit stream by modulo-2 subtraction of the transmission bit stream with said N sync bits, stored within the decoder.

The resulting system thereby provides optimum synchronization and, therefore, data recovery, while requiring a minimum of transmission bits.

2 Claims, 3 Drawing Figures

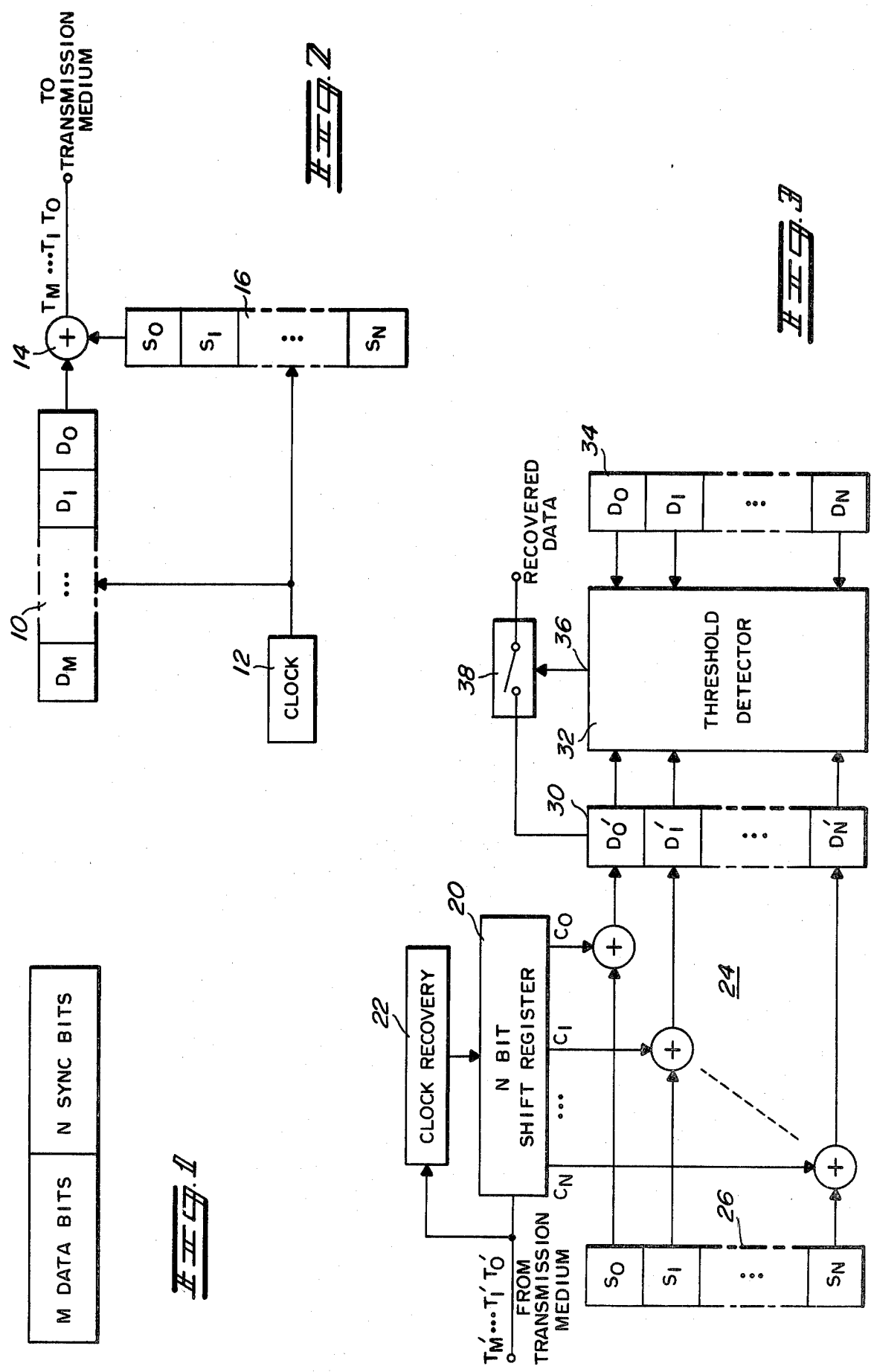

APPARATUS FOR DIGITAL DATA SYNCHRONIZATION

BACKGROUND OF THE INVENTION

This invention relates to the digital communication art and, more particularly, to a means for reducing the length of a transmission bit stream by combining sync bits with data bits.

Digitally encoded communication systems are well known in the art. In such systems, a data bit stream containing digitally encoded information is to be transmitted over a noisy transmission medium. If the raw information data were transmitted without being processed, there would exist a substantial probability that portions of the message might be lost due to interference from the noisy medium. Therefore, this data is normally processed to produce a transmission bit stream, which, after decoding at the receiver provides a means to correct or minimize transmission medium induced errors. Two examples of error correction processing schemes are block and convolutional type codes.

Proper decoding of the transmission bit stream requires that the decoder be able to recognize and synchronize with the received bit stream signal. To assure proper decoding synchronization, the prior art has utilized a predetermined set of N sync bits preceding the M data bits, as is illustrated in FIG. 1. The N sync bits follow a pattern, such as the well known Barker sequence, which optimizes the ability of the decoder to recognize and synchronize with the transmission bit stream.

A problem with the aforementioned prior art synchronization schemes is that the transmission bit stream has a minimum bit length of M+N. In some systems, the number N of sync bits must be substantial with respect to the number of M data bits to assure the desired probability of synchronization whereby the overall message length is quite long, thus requiring a lengthy transmission time. It is, of course, desirable to reduce transmission time to an absolute minimum.

OBJECTS OF THE INVENTION

It is an object of this invention, therefore, to provide an improved digital communication system which minimizes transmission time length.

It is a particular object of the invention to provide the above described improved digital communication system by combining sync bits and data bits.

Briefly, according to the invention, an improved digital communication system includes an encoder which processes a data bit stream having a length M. The encoder comprises encoder storage means having N sync bits stored therein. The encoder combines the M data bits with the N sync bits thereby producing a transmission bit stream having a bit length less than M+N. A decoder for this system processes the transmission bit stream and recovers the data bits. The decoder comprises a decoder storage having the N sync bits stored therein. Provided within the decoder are means for predeterminedly processing the transmission bit stream with the N sync bits thereby regenerating the data bit stream.

BRIEF DESCRIPTION OF THE DRAWINGS

FIG. 1 illustrates the prior art transmission bit stream comprised of M data bits preceeded by N sync bits;

FIG. 2 illustrates a preferred embodiment of the inventive encoder; and

FIG. 3 illustrates a preferred embodiment of the decoder according to the invention.

DETAILED DESCRIPTION OF THE PREFERRED EMBODIMENTS OF THE INVENTION

FIG. 1 illustrates the prior art synchronization encoding scheme wherein N sync bits precede the M data bits to form a transmission bit stream. The decoder processes the N sync bits to prepare for successful reception of the data bits. As mentioned herein above, a basic problem with this prior art sync encoding scheme is that total message length equals M+N, thus requiring a lengthy transmission time.

FIG. 2 illustrates a preferred embodiment of an encoder according to the inventive sync combination scheme. Here the M data bits, $D_o-D_M$, are periodically shifted through a data shift register 10 via a conventional clock 12. The data bits are sequentially passed at the clock rate to a modulo-2 adder 14. Also passed to the modulo-2 adder 14 is the serial output from the encoder sync bit storage register 16. Stored within the sync bit register 16 is a predetermined sequence of sync bits chosen to provide enhanced data bit recovery at the decoder. For example, the sync bit pattern might follow the well known psuedo random sequence.

The N sync bits $S_o-S_n$ are serially passed to the modulo-2 adder 14 in response to pulses from the clock 12. Thus, the output from the modulo-2 adder 14 is a sequence of transmission bits $T_o-T_M$, with each transmission bit $T_k$ being the modulo-2 sum of data bit $D_k$ and sync bit $S_k$. It is assumed for purposes of this discussion that the number of data bits M exceeds the number of sync bits N. Thus, following the combination of the N sync bits with the first N data bits, the subsequent M-N data bits, i.e. $D_{N+1}-D_M$ are passed as transmission bits. Should the number of sync bits exceed the number of data bits then the total length of the transmission bit stream would be N. It is easily seen, therefore, that the transmission bit stream of this preferred embodiment of the invention will have a total length of M or N, whichever is larger, which is a substantial reduction in length over the prior art system of FIG. 1.

After passing over a suitable transmission medium, the transmission bit stream is processed by the preferred embodiment of the decoder, according to the invention, illustrated in FIG. 3. Here, the received transmission bit stream $T_o'-T_M'$ is passed to an N bit shift register 20 and to a clock recovery system 22. The clock recovery system 22 operates in the conventional manner to regenerate the clock signal generated by the encoder clock 12 of FIG. 2. The recovered clock signal is applied to the N bit shift register 20 whereby the input transmission data bits are sequentially stepped down the register 20 at the clock rate. The bit in each cell of the shift register 20 is available at cell outputs $C_o-C_N$, with each of these outputs being applied to one input of a total of N modulo-2 subtractors forming subtractor array 24.

The remaining input of each modulo-2 subtractor is provided by the output from a decoder sync storage register 26. That is, each of the sync bits $S_o-S_n$ contained within the encoding storage register 16 of FIG. 2 is stored within the decoding sync storage register 26. Thus, the output from each modulo-2 subtractor in the array 24 is the modulo-2 difference of a transmission bit and one of the predetermined sync bits.

The outputs from the modulo-2 subtractor array 24 are loaded in parallel to a decoder data recovery register 30. The register 30 has a total of N cells each containing the output from one of the modulo-2 subtractors.

The effect of modulo-2 subtracting the sync bits $S_O-S_n$ from the transmission bits $T_O-T_M$ is to recreate the data bits, here represented in recovery register 30 as $D_0'-D_N'$. The regenerated data bits $D_O'-D_N'$ are continuously compared in a threshold detector 32 with a stored sequence of data bits $D_O-D_N$ stored in the decoder identification register 34. It is the nature of most coding systems that the initial data bits represent a predetermined identification sequence known to both the transmitting and receiving sites. For example, the identification sequence for one system might be the number 0110. Reception of this sequence at the receiving site indicates that a proper message is being received and that the decoding process should commence.

Thus, the threshold detector 32 compares the regenerated data bits stored in register 30 with the known identification sequence stored in register 34 and, when a certain threshold number of bits match the detector, indicates a positive detect status at its output 36, thereby closing switch 38. With switch 38 closed the contents of recovery register 30 are serially fed out through switch 38 as recovered data.

In summary, it can be seen that the inventive digital communication system minimizes the overall length of a transmission bit stream by combining sync bits with data bits. In the preferred embodiment of the invention the combining is performed by the modulo-2 addition of sequential data bits $D_O-D_M$ with sequential sync bits $S_O-S_N$. However, it should be understood that the combination process, i.e. the process whereby data and sync bits are predeterminedly combined to reduce the overall number of transmission bits, may be accomplished in any one of a number of ways. In general, it is contemplated that the $D_k$ data bit may be combined with the S sync bit according to any desired pattern or functional relationship. For example, the first sync bit may be combined with the tenth data bit, the second sync bit with the twelfth data bit, and so forth.

Further, whereas the preferred embodiment of the invention deals with a binary system, it is contemplated in some applications a q-nary system according to the invention may be used wherein the modulo-2 adders are replaced with modulo-q adders.

Moreover, it should be appreciated that the data bit stream $D_O-D_M$ contemplates information data in any stage of processing. That is, the data bit stream may comprise raw information data or information data that has been preprocessed as via some error correcting scheme. It is, of course, significant for the invention only that the data bit stream be combined with the sync bits to thereby produce a reduced length transmission bit stream.

While a preferred embodiment of the invention has been described in detail, it should be apparent that many modifications and variations thereto are possible, all of which fall within the true spirit and scope of the invention.

I claim:

1. A digital communication system for processing a data bit stream having a length M, said bit stream including a predetermined initial identification bit sequence, the system comprising:
   encoder means for encoding said data bit stream including:
   encoder bit storage means having N predetermined sync bits stored therein;
   combining means for predeterminedly combining said N sync bits with said M data bits to thereby produce a transmission bit stream having a bit length less than M+N;
   decoder means for decoding said transmission bit stream including;
   decoder sync bit storage means having said N predetermined sync bits stored therein;
   processing means for predeterminedly processing said transmission bit stream with said N sync bits to thereby regenerate said data bit stream;
   identification bit storage means having said initial identification bit sequence stored therein; and
   detector means for comparing the regenerated data bit stream with the contents of said identification bit storage and producing a detect indication output responsive to a predetermined minimum correlation therebetween to allow passage of the remainder of the regenerated bit stream to an output terminal.

2. The system of claim 1 wherein the combining means is comprised of a modulo-2 adder for modulo-2 adding said M data bits with said N sync bits and wherein the processing means comprises a modulo-2 subtractor for modulo-2 subtracting said N sync bits from the transmission bit stream.

* * * * *